(12) United States Patent
Höme et al.

(10) Patent No.: US 10,382,384 B2
(45) Date of Patent: Aug. 13, 2019

(54) METHOD FOR PROVIDING AN EXPANDED NAME SERVICE FOR AN INDUSTRIAL AUTOMATION SYSTEM

(71) Applicant: Siemens Aktiengesellschaft, Munich (DE)

(72) Inventors: Stephan Höme, Schwabach (DE); Felix Müller, Gilbert, AZ (US); Thomas Talanis, Heroldsbach (DE); Harald Albrecht, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 53 days.

(21) Appl. No.: 15/703,094

(22) Filed: Sep. 13, 2017

(65) Prior Publication Data

US 2018/0077109 A1     Mar. 15, 2018

(30) Foreign Application Priority Data

Sep. 15, 2016   (EP) .................................... 16188876

(51) Int. Cl.
*H04L 29/12*       (2006.01)
*G05B 19/418*      (2006.01)

(52) U.S. Cl.
CPC .......... *H04L 61/10* (2013.01); *H04L 61/1511* (2013.01); *H04L 61/303* (2013.01); *G05B 19/41855* (2013.01); *Y02P 90/185* (2015.11)

(58) Field of Classification Search
CPC ......... H04L 61/00; H04L 61/10; H04L 61/15; H04L 61/1511; H04L 61/1558; H04L 61/1576; H04L 61/1582; H04L 61/1594; H04L 61/20; H04L 61/25–2596; H04L 61/30; H04L 61/3015; H04L 61/3025; H04L 61/303; H04L 61/35; H04L 67/00; H04L 67/12; H04L 67/14; G06F 15/00; G06F 15/16

See application file for complete search history.

(56) References Cited

U.S. PATENT DOCUMENTS

| | | |
|---|---|---|
| 2015/0312096 A1 | 10/2015 | Albrecht |
| 2015/0312213 A1 | 10/2015 | Albrecht |
| 2016/0241511 A1 | 8/2016 | Albrecht |

OTHER PUBLICATIONS

Anonymous: "Domain Name System—Wikipedia" Mar. 10, 2017.

*Primary Examiner* — Tauqir Hussain
*Assistant Examiner* — Boris D Grijalva Lobos
(74) *Attorney, Agent, or Firm* — Cozen O'Connor

(57) ABSTRACT

A method for providing an expanded name service for an industrial automation system, wherein name-address assignments between device names and communication network addresses are registered in a name service system to provide an expanded name service for an industrial automation system, where device names registered in the name service system have a hierarchical structure represented by a tree structure, where assignments between device names and plant identification codes are additionally registered in the name service system, where the plant identification codes are registered within the same tree structure as the device names, and where end nodes that are respectively assigned to the plant identification codes in the tree structure comprise either a reference to end nodes which are respectively assigned to the device names or intermediate nodes for plant identification codes comprise a reference to intermediate nodes that are respectively assigned to plant units.

11 Claims, 3 Drawing Sheets

METHOD FOR PROVIDING AN EXPANDED NAME SERVICE FOR AN INDUSTRIAL AUTOMATION SYSTEM

BACKGROUND OF THE INVENTION

1. Field of the Invention

The present invention relates to the field of plant automation and, more particularly, to a method for providing an expanded name service for an industrial automation system.

Industrial automation systems serve to monitor and perform open- and closed-loop control of technical processes, in particular in the field of the automation of fabrication, processing and building, and make it possible to operate control devices, sensors, machines and industrial plants in a way that is to be as autonomous and independent of human intervention as possible. Owing to a continuously increasing significance of information technology for automation systems that comprise numerous networked control units or computer units, methods for reliably providing functions that are distributed via an automation system for providing monitoring functions and open-loop and closed-loop control functions are becoming increasingly important.

2. Description of the Related Art

Interruptions in communication connections between computer units of an industrial automation system or automation devices can give rise to an undesired or unnecessary repetition of transmission of a service request. This gives rise to an additional utilization of communication connections of the industrial automation system, which can give rise to further system interferences or system faults. Moreover, messages that are not transmitted or not completely transmitted can prevent, for example, a transition of an industrial automation system into a safe operating state, or prevent such from remaining in such a safe operating state. This can finally lead to a failure of an entire production system and a costly production outage. A particular problem experienced in industrial automation systems frequently results from message traffic with messages that are relatively large in number but relatively short, which exacerbates the above problems.

WO 2007/144364 A1 describes a method for networking an automated plant that comprises at least one cell with a subnetwork. The subnetwork is connected to a further subnetwork of the automated plant via a router. In order to network the automated plant, a multicast group is made available that extends over both subnetworks. A communication network address of a communication network interface of an assembly is detected via the multicast group. In this context, the assembly has previously joined the multicast group via the communication network address, and the communication network interface has previously been connected to the subnetwork. A name is allocated to the communication network interface of the assembly via the communication network address. In a further step, a further communication network address of the communication network interface of the assembly, which has at least part of a numerical representation of the name, is determined.

EP 2940926 A1 discloses a method for configuring a communication device within an industrial automation system, in which a configuration unit of the communication device transmits a datagram with a configuration request to a configuration server. The configuration server allocates, in response to the communication request, at least one first topological device name component to the communication device, while the component is assigned to a spatial or hierarchical arrangement of the configuration server. Each forwarding distributor unit adds a further topological device name component that is assigned to a spatial or hierarchical arrangement of the respective forwarding distributor unit. From the topological device name components and a uniquely defined name component within its partial network, the configuration unit of the communication device defines the device names thereof.

EP 2940972 A1 describes providing a name service within an industrial communication system in which router notifications with name information are received from superordinate partial networks by routers that are assigned to subordinate partial networks and the topological or hierarchical name component that is assigned to the respective router is added to the notifications, the latter being distributed within the respective subordinate partial network. Communication terminals autonomously generate their device names from topological or hierarchical name components and a name component that is uniquely defined within its respective partial network.

EP 2975477 A1 relates to a method for registering device names from an industrial automation system in a communication network name service. The communication devices of the industrial automation system for which registration of their respective device names with the communication network name service is permissible or necessary is defined on a device-specific basis using a rule base. With device-side decentralized name service agents, communication network addresses of communication devices are signaled to a central name service agent of the industrial automation system. For a name-address assignment to be registered, the central name service agent transmits a registration request, comprising the name-address assignment, to the communication network name service. Within the industrial automation system, only the central name service agent can transmit registration requests for processing to the communication network name service.

EP 3059930 A1 discloses that in order to configure a communication device of an industrial automation system, a communication network address that is assigned to the communication device is generated autonomously from at least one prefix that is transmitted via router notification messages by at least one router assigned within a subnetwork and from a device-specific interface identifier. The communication device enquires, at at least one server of a name service system corresponding to a name resolution protocol, which communication network addresses are assigned to its communication device name. The communication network addresses interrogated from the server of the name service system are checked for correspondence with the prefix. The communication terminal assigns to itself only the communication network addresses that are interrogated from the server of the name service system and which exhibit correspondence with the prefix transmitted by the router.

In industrial automation systems, there are a plurality of name systems for automation devices owing to technical framework conditions, with the result that an individual automation device can have a plurality of assigned names. On the one hand, automation devices are addressed via their respective host name, which is resolved as a Fully Qualified Domain Name (FQDN) via a Domain Name System (DNS) into a communication network address which is usually IPv4-based or IPv6-based. Within the scope of planning and maintaining a technical plant, plant identification codes, corresponding, for example, to DIN 40719-2 or EN 81346, are also used for plant components. These plant identification codes are very frequently located on labelling on plant components or automation devices. Automation devices and communication devices can therefore be respectively assigned, in particular, a Fully Qualified Domain Name (FQDN) and a plant identification code.

SUMMARY OF THE INVENTION

It is an object of the present invention to provide an easy to implement method for providing a name service within an industrial automation system that permits a reliable response of automation devices or communication devices even via plant identification codes.

This and other objects and advantages are achieved in accordance with the invention by a method for providing an expanded name service for an industrial automation system, in a name service system comprising at least one name service server, name-address assignments between device names and communication network addresses are registered for automation devices or communication devices. Based on these name-address assignments, an assigned communication network address is provided in response to a name resolution request. In this context, device names registered in the name service system have a hierarchical structure represented by a tree structure. The tree structure comprises a root node, internal nodes and end nodes.

In accordance with the invention, in addition to the name-address assignments, assignments between device names and plant identification codes for automation devices or communication devices are registered in the name service system. The device names can be, in particular, Fully Qualified Domain Names. The plant identification codes are registered within the same tree structure as the device names, and end nodes that are respectively assigned to the plant identification codes in the tree structure contain a reference to end nodes that are respectively assigned to the device names. As an alternative to this, intermediate nodes for plant identification codes can comprise a reference to intermediate nodes that are respectively assigned to plant units. The references to end nodes that are respectively assigned to the device names, or the references to intermediate nodes that are respectively assigned to plant units are preferably made via Canonical Name (CNAME) Resource Records or Domain Name (DNAME) Resource Records. In the event of a request to resolve a plant identification code, a device name is determined based on the assignments between device names and plant identification codes and a name resolution request for the determination of an assigned communication network address is made for the device name.

With the present invention, it is possible for plant operators or plant maintenance personnel to read the plant identification codes directly from the automation devices or communication devices and directly access an automation device or communication device based on the respective plant identification code via a customary web browser. This permits a more efficient execution of servicing or maintenance processes in an industrial automation system. Furthermore, assignments between device names and host names during ongoing operation of an industrial automation system can be registered or updated.

In particular, no browser extensions or interventions into existing software architectures are necessary to use the present invention in a customary web browser.

In accordance with one preferred embodiment of the present invention, the device names and the plant identification codes of automation devices or communication devices of an automation plant are administered within separate plant-specific partial trees of the tree structure. In this context, the root node of the partial tree for the device names comprise a reference to the assigned root node of the partial tree for the plant identification codes. The reference to the assigned root node of the partial tree for the plant identification codes can be made, for example, via a Text Resource Record in the root node of the partial tree for the device names. The root node of the partial tree for the device names preferably forms a zone head of the partial tree for the device names, while the root node of the partial tree for the plant identification codes forms a zone head of the partial tree for the plant identification codes. In this context, the zone heads are each identified by a Start of Authority Resource Record.

When a plant identification code is registered, the assigned device name is determined in accordance with an advantageous embodiment of the present invention. The root node of the partial tree for the device names is then determined based on the determined device name. The assigned root node of the partial tree for the plant identification codes is in turn determined based on the determined root node of the partial tree for the device names. An end node underneath the determined root node of the partial tree for the plant identification codes is then generated for the plant identification code to be registered.

In a further advantageous embodiment of the method in accordance with the invention the plant identification codes are encoded based on a predefined encoding rule corresponding to Automation Domain Name Algorithm or corresponding to RFC 3405 in conjunction with RFC 2483, and having been encoded in accordance with the predefined encoding rule are stored by the name service server. Therefore, special characters or regional letter sets can be used for the plant identification codes in addition to characters which can be used in Domain Name Systems. For example, a user input of a plant identification code can be requested for a plant-identification-code-based addressing process of an automation device or communication device. In this case, a plant identification code that is input by a user is encoded in accordance with the predefined encoding rule, and having been encoded in accordance with the predefined encoding rule is transmitted for plant identification code resolution to the name service server. The name service server then performs resolution of the plant identification code into an assigned communication network address for a plant identification code that has been encoded in accordance with the predefined encoding rule.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below on the basis of an exemplary embodiment and with reference to the drawings, in which.

DETAILED DESCRIPTION OF THE EXEMPLARY EMBODIMENTS

Figure 1:
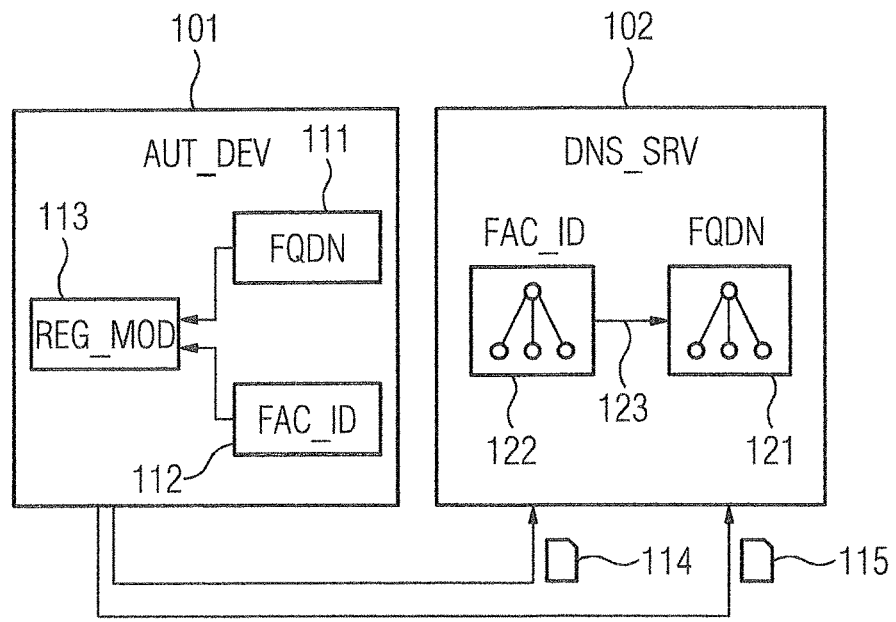
FIG. 1 shows an automation device having an FQDN device name and a plant identification code and a DNS server for administering in each case a name tree for FQDN device names and plant identification codes in accordance with the invention.

FIG. 1 illustrates an arrangement having an automation device 101, to which an FQDN device name 111 and a plant identification code 112 are assigned, and having a DNS server 102 that administers both a name tree 121 for FQDN device names and a name tree for plant identification codes 122. The automation device 101 can be, for example, a stored-program controller. With DNS-Updated Requests 114, 115 corresponding to RFC 2136, a DNS registration module 113 of the automation device 101 requests registration of a FQDN device name 111 or of its plant identification code 112 and of its communication network address by the DNS server 102.

In order to provide an expanded name service for an industrial automation system, the DNS server 102 comprises name-address assignments between FQDN device names and communication network addresses for automation devices and communication devices. Based on these name-address assignments, the DNS server 102 provides an assigned communication network address in response to a name resolution request. FQDN device names that are registered in the DNS server 102 have a hierarchical structure represented by a tree structure, where the tree structure comprises a root node, internal nodes and end nodes. The communication network addresses are registered and updated by the DNS server 102 as IP addresses in the form of one or more A/AAAA Resource Records.

Figure 2:
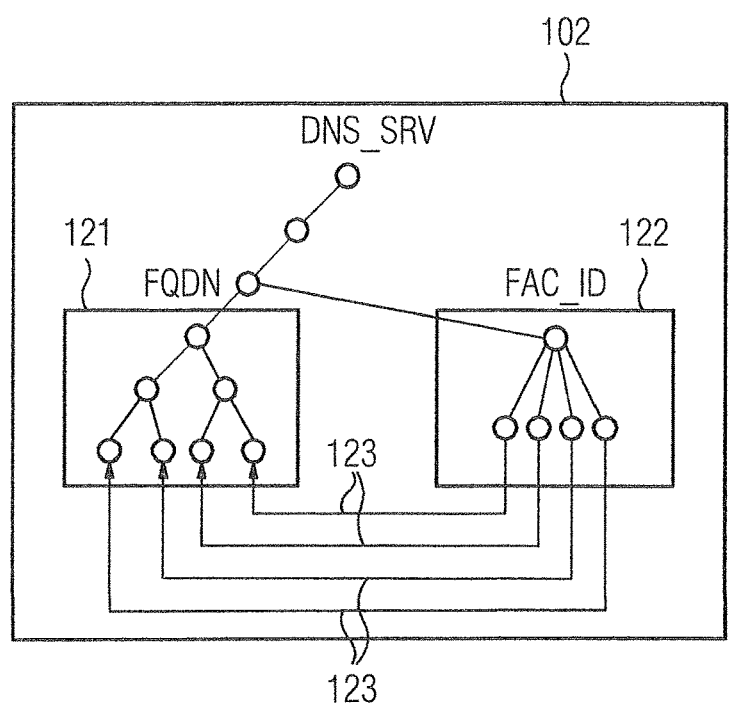
FIG. 2 shows an illustration of a linking of end nodes of the name tree for plant identification codes with end nodes of the name tree for FQDN device names in accordance with the invention.

In addition to the name-address assignments, assignments between FQDN device names and plant identification codes are registered in the DNS server 102. The plant identification codes are registered within the same tree structure as the FQDN device names. In this context, end nodes that are respectively assigned to the plant identification codes in the tree structure comprise a reference 123 to end nodes that are respectively assigned to the FQDN device names (see also FIG. 2). If FQDN device names are to be structured further in the name service system and, for example, represent partial plants or plant units, then intermediate nodes for plant identification codes can comprise a reference to intermediate nodes that are respectively assigned to plant units. The references to end nodes that are respectively assigned to the FQDN device names or to intermediate nodes that are respectively assigned to plant units are made in the present exemplary embodiment via CNAME Resource Records corresponding to RFC 1034 and 1035 or DNAME Resource Records corresponding to RFC 6672.

Figure 3:
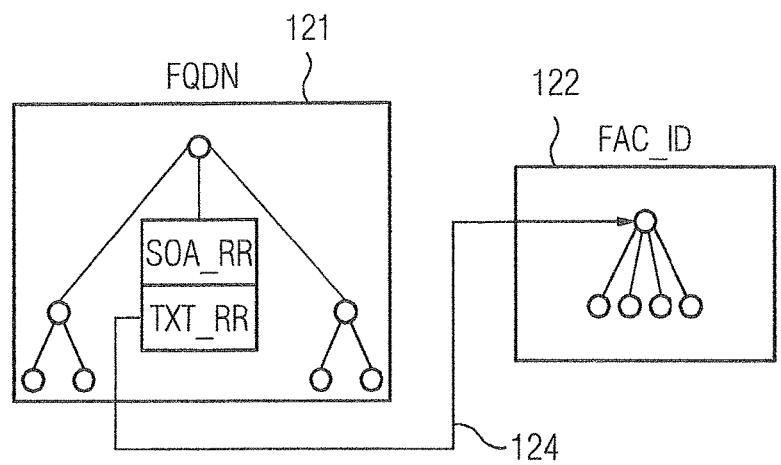
FIG. 3 shows an illustration of a linking of a root node of the name tree for FQDN device names with a root node of the name tree for plant identification codes in accordance with the invention.

The FQDN device names and the plant identification codes of automation devices of an automation plant are administered within separate plant-specific name trees 121, 122 of the tree structure. In the present exemplary embodiment, the root node of the name tree 121 for the FQDN device names depicted in FIG. 3 comprises a reference 124 to the assigned root node of the name tree 122 for the plant identification codes. This reference 124 to the assigned root node of the name tree 122 for the plant identification codes is made via a Text Resource Record in the root node of the name tree 121 for the FQDN device names.

The root node of the name tree 121 for the FQDN device names forms a zone head of the name tree 121 for the FQDN device names, while the root node of the name tree 122 for the plant identification codes forms a zone head of the name tree 122 for the plant identification codes. The zone heads are each identified by a Start of Authority Resource Record. By virtue of the reference 124 of the root node of the name tree 121 for the FQDN device names to the root node of the name tree 122 for the plant identification codes, repeated manual and, in some cases, error-prone configuration of plant-specific information can be dispensed with, because this information has to be stored at just one location in the plant-specific name tree 121 for the FQDN device names. Separate name trees 121, 122 for the FQDN device names and for the plant identification codes permit a flexible operation of DNS servers, because, FQDN device names and plant identification codes are administered in separate DNS zones and can be provided, for example, over various DNS servers to distribute the load. Nevertheless, IP address entries (A/AAAA-RR) have to be kept at just one point, specifically at the customary location in the name tree 121 for the FQDN device names.

The plant identification codes are encoded in a DNS-compatible manner for registration in the DNS server 102, for example via an Automation Domain Names for Applications (ADNA) algorithm. As an alternative for this, encoding of the plant identification codes can be implemented using a DDDS DNS database corresponding to RFC 3404 under the control of encoding rules that are likewise stored in the DNS server 102, for example, corresponding to RFC 3405 in conjunction with RFC 2483. It is therefore possible to adapt the encoding of plant identification codes in the name tree 122 for the plant identification codes in accordance with the individual requirements without adaptations to the registration module 113 of the respective automation device 101 being required for this purpose.

Figure 4:
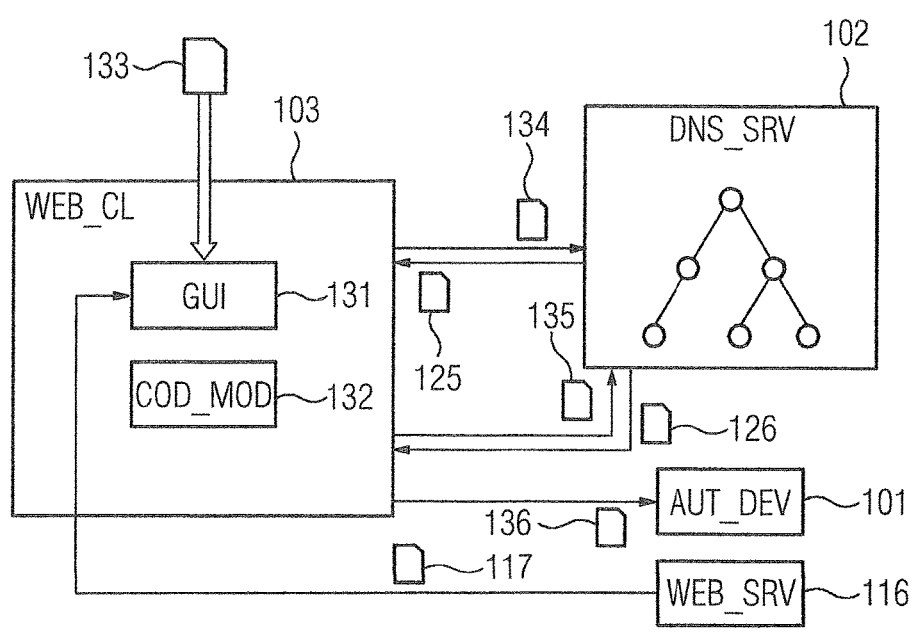
FIG. 4 shows a schematic illustration of a plant identification code resolution in accordance with the invention.

With reference to FIG. 4, a typical sequence during resolution of the plant identification code 112 of the automation device 101 in the communication network address thereof is illustrated. For example, a web server 116 assigned to the automation device 101 provides a HTML document 117 to a computer unit 103 with a graphic user interface 131 for inputting of a plant identification code 133 to be addressed. The computer unit subsequently transmits a message 134 with a request for the determination of the root node of the plant-specific name tree 122 for the plant identification codes, in which name tree 122 encoding rules to be applied for the plant identification codes are stored. The DNS server 102 replies to this message 134 with a message 125 in which the encoding rules to be applied for the plant identification codes are specified. An encoding module 132 implemented via the computer unit 103 subsequently encodes, in accordance with the encoding rules to be applied, the plant identification code 133 that has been input and that is to be addressed. The computer unit 103 then transmits a message 135 with a HTTP GET Request for a dynamically generated Uniform Resource Identifier (URI). In this context, the Uniform Resource Identifier comprises the root node of the plant-specific name tree 122 for the plant identification codes and the plant identification code encoded in accordance with the encoding rules to be applied. In the DNS server 102, a name resolution is performed for this dynamically generated Uniform Resource Identifier, where the reference 123 of the encoded plant identification code 112 to the FQDN device name 111 is followed by the searched-for A/AAAA Resource Records. The message 135 with the HTTP Get Request is responded to by the DNS server 102 with a message 126 that comprises the searched-for A/AAAA Resource Records. In this way, the computer unit 103 can address a message 136 to the automation device 102 to retrieve desired status information or to transmit control commands.

Figure 5:
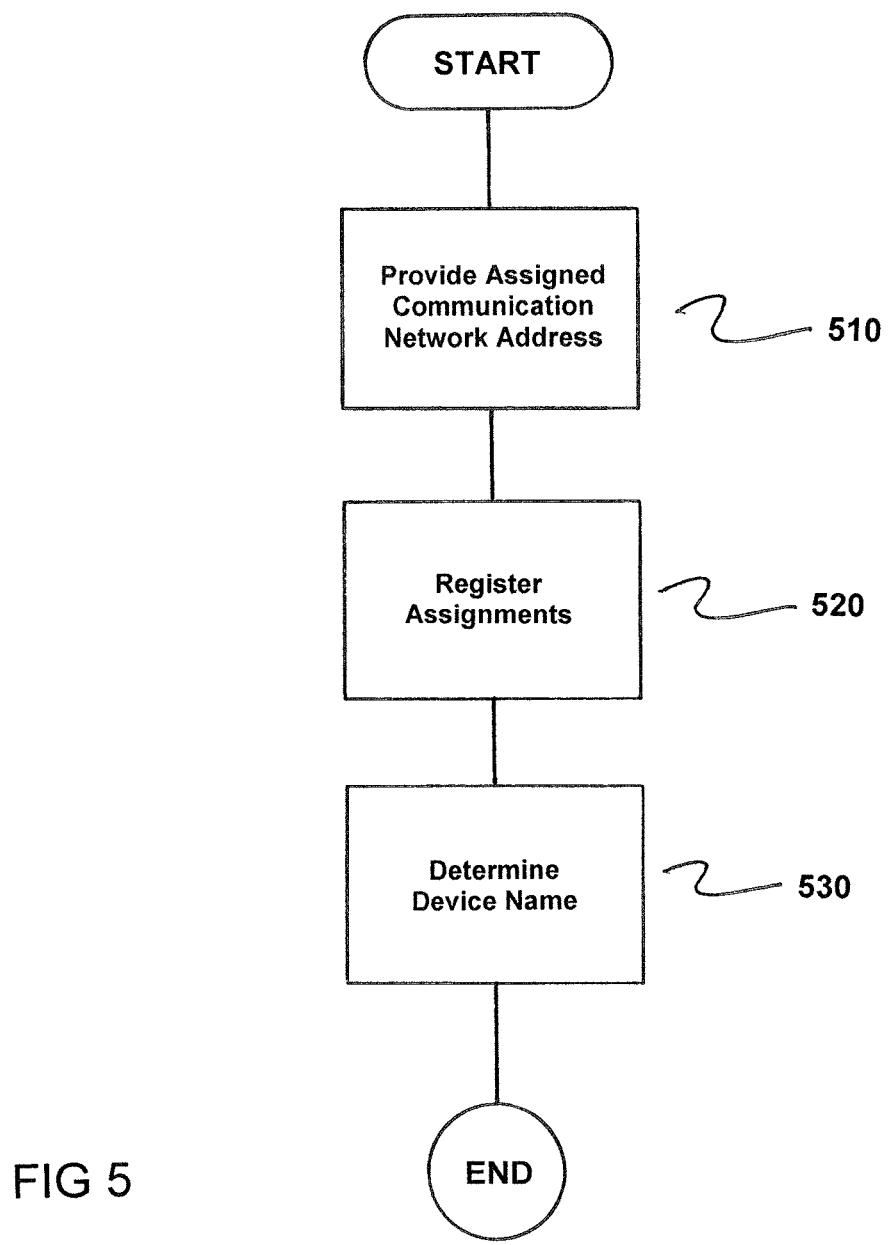
FIG. 5 is a flowchart of the method in accordance with the invention.

FIG. 5 is a flowchart of the method for providing an expanded name service for an industrial automation system. The method comprises providing an assigned communication network address in response to a name resolution request based on registered name-address assignments between device names and communication network addresses in a name service system comprising at least one name service server for at least one of (i) automation devices and (ii) communication devices, as indicated in step 510. In accordance with the invention, device names registered in the name service system have a hierarchical structure represented by a tree structure, and the tree structure comprises a root node, internal nodes and end nodes.

Next, assignments between device names and plant identification codes are registered for at least one of (i) the automation devices and (ii) the communication devices in the name service system in addition to name-address assignments, as indicated in step 520. Here, the plant identification codes are registered within the same tree structure as the device names, and one of (i) end nodes which are respectively assigned to the plant identification codes in the tree structure contain a reference to end nodes that are respectively assigned to the device names and (ii) intermediate nodes for plant identification codes comprise a reference to intermediate nodes which are respectively assigned to plant units.

Next, a device name is now determined based on assignments between the device names and plant identification codes and a name resolution request is performed to determine an assigned communication network address for the device name when a request to resolve a plant identification code is present, as indicated in step 530.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method step shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for providing an expanded name service for an industrial automation system, comprising:
   providing an assigned communication network address in response to a name resolution request based on registered name-address assignments between device names and communication network addresses in a name service system comprising at least one name service server for at least one of (i) automation devices and (ii) communication devices, device names registered in the name service system having a hierarchical structure represented by a tree structure, and the tree structure comprising a root node, internal nodes and end nodes;
   registering assignments between device names and plant identification codes for at least one of (i) the automation devices and (ii) the communication devices in the name service system in addition to name-address assignments, the plant identification codes being registered within the same tree structure as the device names, and one of (i) end nodes which are respectively assigned to the plant identification codes in the tree structure containing a reference to end nodes which are respectively assigned to the device names and (ii) intermediate nodes for plant identification codes comprise a reference to intermediate nodes which are respectively assigned to plant units; and
   determining a device name based on assignments between the device names and plant identification codes and performing a name resolution request to determine an assigned communication network address for the device name when a request to resolve a plant identification code is present.

2. The method as claimed in claim 1, wherein the device names and the plant identification codes of at least one of (i) the automation devices and (ii) the communication devices of an automation plant are administered within separate plant-specific partial trees of the tree structure, and a root node of a partial tree for the device names comprises a reference to an assigned root node of the partial tree for the plant identification codes.

3. The method as claimed in claim 2, wherein when a plant identification code is registered, the assigned device name is determined;
   wherein the root node of the partial tree for the device names is determined based on the determined device name;
   wherein the assigned root node of the partial tree for the plant identification codes is determined based on the determined root node of the partial tree for the device names; and
   wherein an end node below the determined root node of the partial tree for the plant identification codes is generated for the plant identification code to be registered.

4. The method as claimed in claim 2, wherein the reference to the assigned root nodes of the partial tree for the plant identification codes is made via a Text Resource Record in the root node of the partial tree for the device names.

5. The method as claimed in claim 3, wherein the reference to the assigned root nodes of the partial tree for the plant identification codes is made via a Text Resource Record in the root node of the partial tree for the device names.

6. The method as claimed in claim 2, wherein the root node for the partial tree for the device names forms a zone head of the partial tree for the device names;

wherein the root node of the partial tree for the plant identification codes forms a zone head of the partial tree for the plant identification codes; and wherein the zone heads are each identified by a Start of Authority Resource Record.

7. The method as claimed in claim 3, wherein the root node for the partial tree for the device names forms a zone head of the partial tree for the device names;

wherein the root node of the partial tree for the plant identification codes forms a zone head of the partial tree for the plant identification codes; and wherein the zone heads are each identified by a Start of Authority Resource Record.

8. The method as claimed in claim 4, wherein the root node for the partial tree for the device names forms a zone head of the partial tree for the device names;

wherein the root node of the partial tree for the plant identification codes forms a zone head of the partial tree for the plant identification codes; and wherein the zone heads are each identified by a Start of Authority Resource Record.

9. The method as claimed in claim 1, wherein references to end nodes which are respectively assigned to the device names or intermediates nodes which are respectively assigned to the plant units are made via Canonical Name (CNAME) Resource Records or Domain Name (DNAME) Resource Records.

10. The method as claimed in claim 1, wherein the plant identification codes are encoded based on the basis a predefined encoding rule corresponding to Automation Domain Name Algorithm or corresponding to RFC 3405 in conjunction with RFC 2483, and having been encoded in accordance with the predefined encoding rule are stored by the at least one name service server.

11. The method as claimed in claim 10, wherein a user input of a plant identification code is requested for a plant-identification-code-based addressing process of at least one of (i) the automation device and (ii) the communication device, wherein a plant identification code which is input by the user is encoded in accordance with the predefined encoding rule, and having been encoded in accordance with the predefined encoding rule is transmitted for plant identification code resolution to the name service server, and wherein the at least one name service server resolves the plant identification code into an assigned communication network address for a plant identification code which has been encoded in accordance with the predefined encoding rule.

* * * * *